US012665833B2

(12) United States Patent
Tollet et al.

(10) Patent No.: US 12,665,833 B2
(45) Date of Patent: Jun. 23, 2026

(54) DYNAMIC MAPPING OF NETWORKS TO MULTI-TENANTED BGP SERVERS

(71) Applicant: Cisco Technology, Inc., San Jose, CA (US)

(72) Inventors: Jerome Tollet, Paris (FR); Arthur de Kerhor, Paris (FR); Benoit Ganne, Malakoff (FR); Dawn Minion, Plumas Lake, CA (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 18/939,703

(22) Filed: Nov. 7, 2024

(65) Prior Publication Data

US 2025/0247321 A1 Jul. 31, 2025

Related U.S. Application Data

(60) Provisional application No. 63/627,691, filed on Jan. 31, 2024.

(51) Int. Cl.
*H04L 45/02* (2022.01)
*H04L 61/256* (2022.01)
*H04L 61/2592* (2022.01)

(52) U.S. Cl.
CPC ............ *H04L 45/04* (2013.01); *H04L 61/256* (2013.01); *H04L 61/2592* (2013.01)

(58) Field of Classification Search
CPC ... H04L 45/04; H04L 61/256; H04L 61/2592;
H04L 61/2514; H04L 45/586; H04L 12/4633; H04L 67/1097; H04L 12/4641; H04L 69/22; H04L 49/70; H04L 61/103
See application file for complete search history.

(56) References Cited

U.S. PATENT DOCUMENTS

| | | | | |
|---|---|---|---|---|
| 9,692,698 B2 * | 6/2017 | Cherian | .................. | H04L 69/22 |
| 9,742,626 B2 * | 8/2017 | Ramachandran | ... | H04L 41/0668 |
| 9,900,250 B2 * | 2/2018 | Dong | ..................... | H04L 45/586 |
| 11,102,032 B2 * | 8/2021 | Cidon | ..................... | H04L 12/14 |
| 11,329,913 B2 * | 5/2022 | Duan | ...................... | H04L 43/10 |
| 11,881,964 B2 * | 1/2024 | Rubenstein | ......... | H04L 12/4633 |
| 12,052,276 B2 * | 7/2024 | Burns | .................. | H04L 63/105 |
| 12,155,569 B1 * | 11/2024 | Cirkovic | ................ | H04L 45/66 |
| 12,199,839 B2 * | 1/2025 | Kolar | ................... | H04L 43/045 |
| 2019/0089627 A1 * | 3/2019 | Mirsky | .................. | H04L 45/50 |

(Continued)

*Primary Examiner* — Sargon N Nano
(74) *Attorney, Agent, or Firm* — Polsinelli P.C.

(57) ABSTRACT

The present technology pertains to receiving, by a multi-tenanted cloud-native headend, network traffic from a source that is directed to a destination within a network of a first tenant, where the network traffic is routed using BGP over a multi-tenanted BGP network, where the multi-tenanted BGP network utilizes route isolation to isolate the network of the first tenant from networks of other tenants making use of the multi-tenanted BGP network, mapping the received network traffic based on at least a source IP, source port, and virtual network interface (VNI) to a port associated with the network of the first tenant over the isolated BGP route, where the mapping is a stateful mapping, where the mapping is also potentially based on other information associated with the network traffic, and directing the received network traffic to a local address in the network of the first tenant.

20 Claims, 6 Drawing Sheets

┌─ 400

RECEIVE, BY A MULTI-TENANTED CLOUD-NATIVE HEADEND, A REQUEST TO CREATE A BGP SESSION WITH A BGP SERVER INSTANCE TO EXCHANGE BGP ROUTES OVER A MULTI-TENANTED BGP NETWORK, THE REQUEST TO CREATE THE BGP SESSION IS RECEIVED OVER A FIRST TUNNEL ASSOCIATED WITH A FIRST TENANT HAVING A FIRST TENANT ID AND THE FIRST TUNNEL HAVING A TUNNEL ID 402

TRANSLATE A TRANSMISSION HEADER INTO A GENEVE PACKET, WHEREIN THE TENANT ID IS ENCODED INTO A VNI IN THE GENEVE PACKET, AND WHEREIN THE TUNNEL ID IS STORED AS METADATA ASSOCIATED WITH THE GENEVE PACKET 404

TRANSLATE, USING A NAT SERVICE, HEADER INFORMATION FROM THE GENEVE PACKET AND METADATA, WHEREIN THE NAT SERVICE TRANSLATES THE TENANT ID INTO A DESTINATION BGP IP ADDRESS USED FOR BGP COMMUNICATIONS WITH THE BPG SERVER FROM THE FIRST TENANT, AND TRANSLATES THE TUNNEL ID INTO A BGP SOURCE IP ADDRESS USED FOR BGP COMMUNICATIONS WITH THE BGP SERVER FROM THE FIRST TUNNEL 406

ESTABLISH THE BGP SESSION WITH THE BGP SERVER INSTANCE THAT IS SPECIFIC TO THE TENANT USING THE SOURCE BGP IP ADDRESS AND DESTINATION BGP IP ADDRESS FROM THE NAT SERVICE 408

(56)          References Cited

U.S. PATENT DOCUMENTS

2021/0409336 A1    12/2021  Talur et al.
2022/0321469 A1    10/2022  Qian et al.
2022/0385564 A1*  12/2022  Langemak ........... H04L 41/0816
2022/0385572 A1    12/2022  Murray et al.
2024/0007419 A1     1/2024  Zhang et al.
2024/0144269 A1*   5/2024  Szigeti .................... H04L 63/20
2024/0179115 A1     5/2024  Brar et al.
2025/0130911 A1*   4/2025  Hulick, Jr. ............ G06F 11/302

* cited by examiner

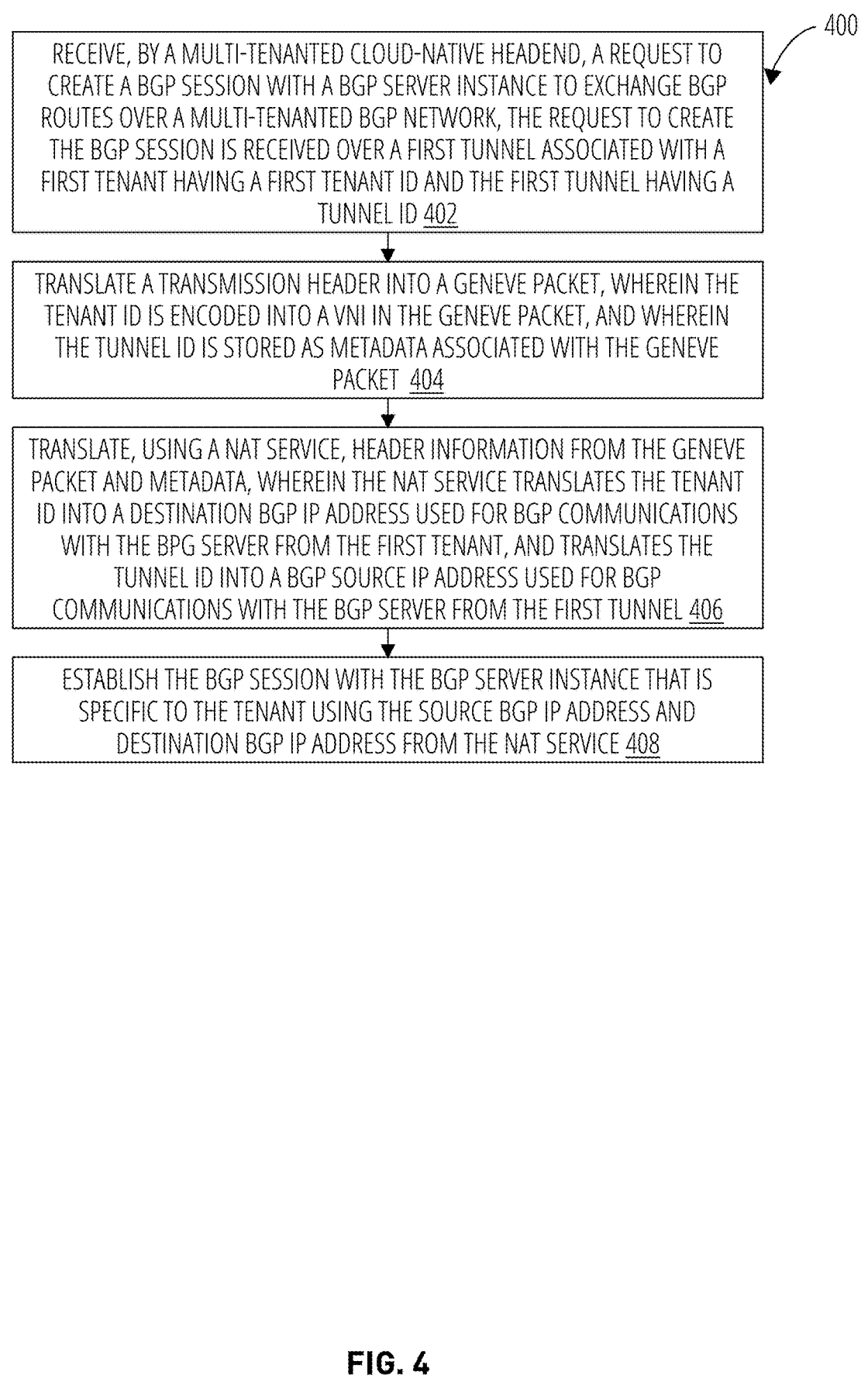

400

RECEIVE, BY A MULTI-TENANTED CLOUD-NATIVE HEADEND, A REQUEST TO CREATE A BGP SESSION WITH A BGP SERVER INSTANCE TO EXCHANGE BGP ROUTES OVER A MULTI-TENANTED BGP NETWORK, THE REQUEST TO CREATE THE BGP SESSION IS RECEIVED OVER A FIRST TUNNEL ASSOCIATED WITH A FIRST TENANT HAVING A FIRST TENANT ID AND THE FIRST TUNNEL HAVING A TUNNEL ID 402

TRANSLATE A TRANSMISSION HEADER INTO A GENEVE PACKET, WHEREIN THE TENANT ID IS ENCODED INTO A VNI IN THE GENEVE PACKET, AND WHEREIN THE TUNNEL ID IS STORED AS METADATA ASSOCIATED WITH THE GENEVE PACKET 404

TRANSLATE, USING A NAT SERVICE, HEADER INFORMATION FROM THE GENEVE PACKET AND METADATA, WHEREIN THE NAT SERVICE TRANSLATES THE TENANT ID INTO A DESTINATION BGP IP ADDRESS USED FOR BGP COMMUNICATIONS WITH THE BPG SERVER FROM THE FIRST TENANT, AND TRANSLATES THE TUNNEL ID INTO A BGP SOURCE IP ADDRESS USED FOR BGP COMMUNICATIONS WITH THE BGP SERVER FROM THE FIRST TUNNEL 406

ESTABLISH THE BGP SESSION WITH THE BGP SERVER INSTANCE THAT IS SPECIFIC TO THE TENANT USING THE SOURCE BGP IP ADDRESS AND DESTINATION BGP IP ADDRESS FROM THE NAT SERVICE 408

FIG. 4

DYNAMIC MAPPING OF NETWORKS TO MULTI-TENANTED BGP SERVERS

CROSS-REFERENCE TO RELATED APPLICATIONS

This application claims the benefit of priority to U.S. provisional application No. 63/627,691, filed on Jan. 31, 2024, which is expressly incorporated by reference herein in its entirety.

TECHNICAL FIELD

The present technology pertains to multi-tenanted networks, and, more specifically, to BGP multi-tenanted networks with dedicated control planes associated with respective tenants.

BACKGROUND

Cloud-native headends and Border Gateway Protocol (BGP) multi-tenanted networks synergize to create a scalable, efficient, and flexible networking solution for modern cloud environments. Cloud-native headends are designed using containerization and microservices principles, allowing them to be dynamically deployed and managed via orchestration platforms like Kubernetes. These headends handle essential networking tasks such as routing, traffic management, and security enforcement. Each headend can operate independently, ensuring strict tenant isolation and enabling rapid scaling in response to changing network demands. This modular approach enhances the network's resilience and simplifies updates and maintenance, promoting a highly available and robust networking environment.

In conjunction with a multi-tenanted BGP network, cloud-native headends can manage access to a BGP server which can effectively manage and propagate routing information for a BGP network.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 4 illustrates an example flowchart for statefully mapping the received network traffic to the appropriate isolated instances of the multi-tenanted BGP network in accordance with some aspects of the present technology.

DESCRIPTION OF EXAMPLE EMBODIMENTS

Figure 1:
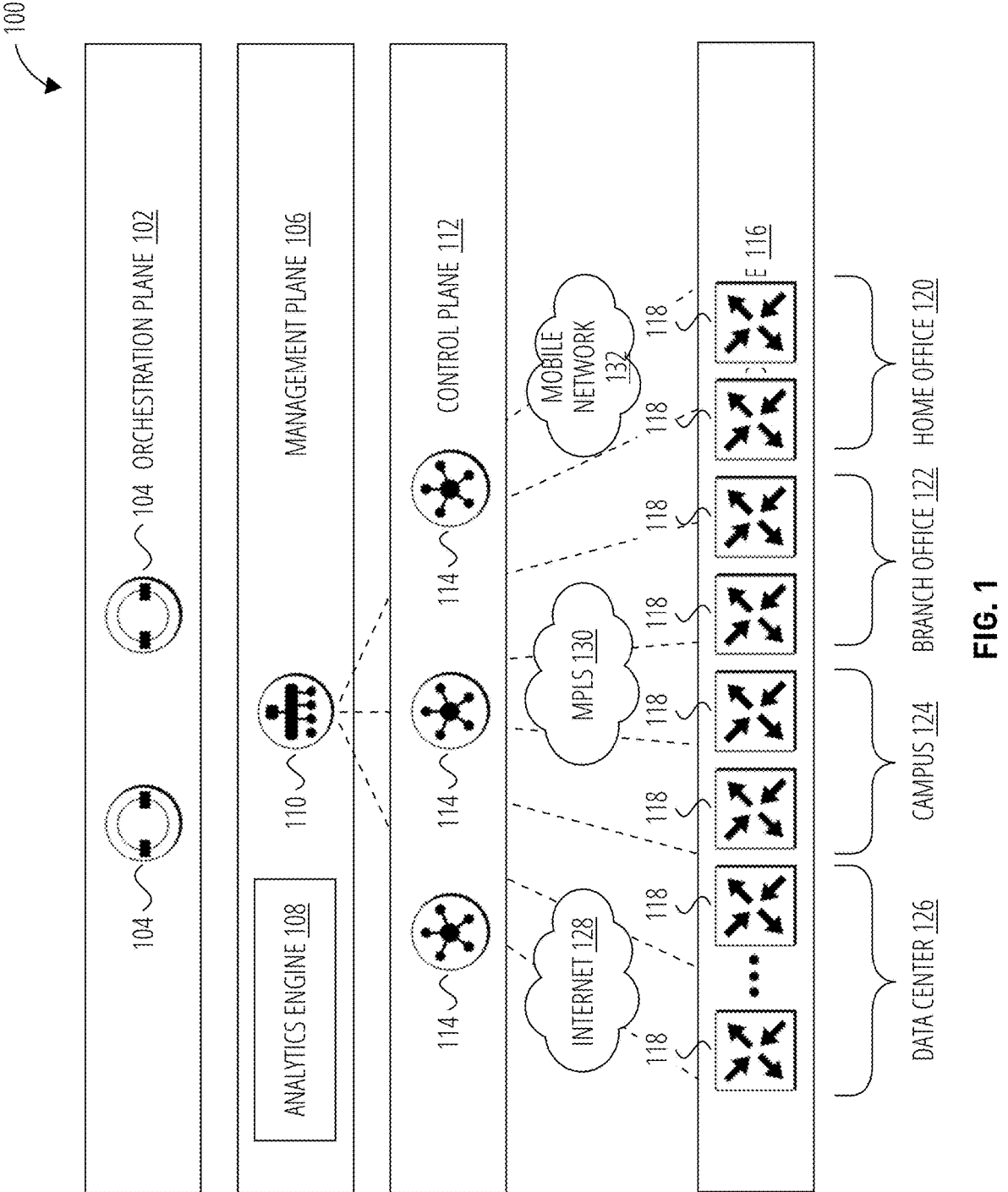
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method may include receiving, by a multi-tenanted cloud-native headend, a request to create a BGP session with a BGP server instance to exchange BGP routes over a multi-tenanted BGP network. The request to create the BGP session may be received over a first tunnel associated with a first tenant having a first tenant ID and the first tunnel having a first tunnel ID. The method may further include translating a transmission header into a Geneve packet, where the first tenant ID is encoded into a VNI in the Geneve packet. The first tunnel ID may be stored as metadata associated with the Geneve packet. The method may further include translating, using a NAT service, header information from the Geneve packet and metadata. The NAT service may translate the first tenant ID into a destination BGP IP address used for BGP communications with the BPG server from the first tenant and may translate the first tunnel ID into a source BGP IP address used for BGP communications with the BGP server from the first tunnel. The method may further include establishing the BGP session with the BGP server instance that is specific to the first tenant using the source BGP IP address and destination BGP IP address from the NAT service.

In another aspect, the method may include receiving, by a multi-tenanted cloud-native headend, a second request to create a second BGP session with the first BGP server instance. The second request may be received over a second tunnel associated with a second tenant having a second tenant ID and the second tunnel having a second tunnel ID, where the second tenant ID is the same as the first tenant ID associated with the first tenant. The method may further include translating a second transmission header into a second Geneve packet, where the second tenant ID is encoded into a second VNI in the second Geneve packet, and where the second tunnel ID is stored as metadata associated with the second Geneve packet. The method may further include translating, using the NAT service, header information from the second Geneve packet and metadata, where the NAT service translates the second tenant ID into a second destination BGP IP address used for BGP communications with the BGP server from the second tenant. The method may further include translating the second tunnel ID into a second BGP source IP address used for BGP communications with the BGP server from the second tunnel. The method may further include establishing the second BGP session with the first BGP server instance using the second source BGP IP address and second destination BGP address from the NAT service.

In another aspect, a client IP address and a port in the transmission header identifies the tenant ID. In another aspect, a client IP address and a port in the transmission header identifies the tunnel ID. In another aspect, the tunnel ID may be stored in association with the BGP server instance in a routing table accessible by the multi-tenanted cloud-native headend.

In another aspect, the method may include receiving a transmission from the BGP session associated with the BGP server instance, where a return tenant ID and a return tunnel ID are inferred from the BGP session and encoded in a return destination BGP IP address and a return source BGP IP address, wherein the transmission from the BGP session is encapsulated within a third Geneve packet by the NAT service. The method may further include transforming the third Geneve packet to include a return client IP and a return port based on the return tunnel ID and the return tenant ID.

In another aspect, the multi-tenanted BGP network utilizes route isolation to isolate the network of the first tenant from networks of other tenants making use of the multi-tenanted BGP network. Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for mapping network traffic to a particular network in a multi-tenanted BGP network. The invention solves problems that can occur with a multi-tenanted shared service, where the tenants are utilizing an SD-WAN to connect to the multi-tenanted shared service. For example, the multi-tenanted shared service may be a BGP server. In some SD-WAN networks, SD-WAN customers may assign ranges of IP addresses that might overlap with IP addresses from an SD-WAN of another tenant. This can cause problems with the functioning of the multi-tenanted service.

As an illustrative example, two different tenants, Tenant A and Tenant B, both use the same IP address range (e.g., 192.0.2.1/24). The two different tenants have an IP address space and routing requirements. Tenant A and Tenant B may attempt to initiate a BGP session with the multi-tenanted BGP service. Since Tenant A and Tenant B are using the same IP address range, the cloud-native headend might not be able to differentiate Tenant A and Tenant B and might permit route advertisements to conflict or overlap. This may result in routing inconsistencies and potential outages within the network. Additionally, the BGP service may not be able to establish a session with both tenants simultaneously due to the conflicting routes. This would prevent either tenant from exchanging routing information effectively. In some examples, the use of a multi-tenanted cloud native headed may increase the chance of an IP address range overlap.

In some examples, Tenant A and Tenant B could have their own unique IP address space or ASN to avoid conflicts. In some other examples, route filtering mechanisms could be implemented (e.g., prefix lists) on the BGP service to prevent conflicting routes from being advertised. In some other examples, techniques like VRFs (Virtual Routing and Forwarding) may be used to separate BGP instances for each tenant, allowing you to isolate their routing information and avoid conflicts. However, these methods of addressing the overlapping IP address ranges require tenant configuration. The present technology addresses this IP address range overlap by statefully mapping the received network traffic to the appropriate isolated instances of the multi-tenanted BGP network. By establishing unique BGP server instances for individual tenants and/or clients of a tenant using tunnel identifiers, tenant identifiers, port number, etc., a cloud-native headend may be configured to automatically address the overlapping IP address ranges without any interference by the tenants themselves. Requests from tenants may be mapped to respective BGP server instances, thereby maintaining isolation between tenants without sacrificing network performance. The implementation of the disclosed embodiment is transparent to the SD-WAN router associated with Tenant A and Tenant B, and is not a straightforward solution (e.g., a proxy).

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

FIG. 1 illustrates an example of a high-level network architecture in accordance with some aspects of the present technology. An example of an implementation of the network architecture 100 is the Cisco® SD-WAN architecture. However, one of ordinary skill in the art will understand that, for the network architecture 100 and any other system discussed in the present technology, there can be additional or fewer component in similar or alternative configurations. The illustrations and examples provided in the present technology are for conciseness and clarity. Other embodiments may include different numbers and/or types of elements but one of ordinary skill the art will appreciate that such variations do not depart from the scope of the present technology.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some examples, analytics engine 108 may monitor, analyze, and optimize the performance and security of the network of network architecture 100. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively, or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), BGP, Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. BGP is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
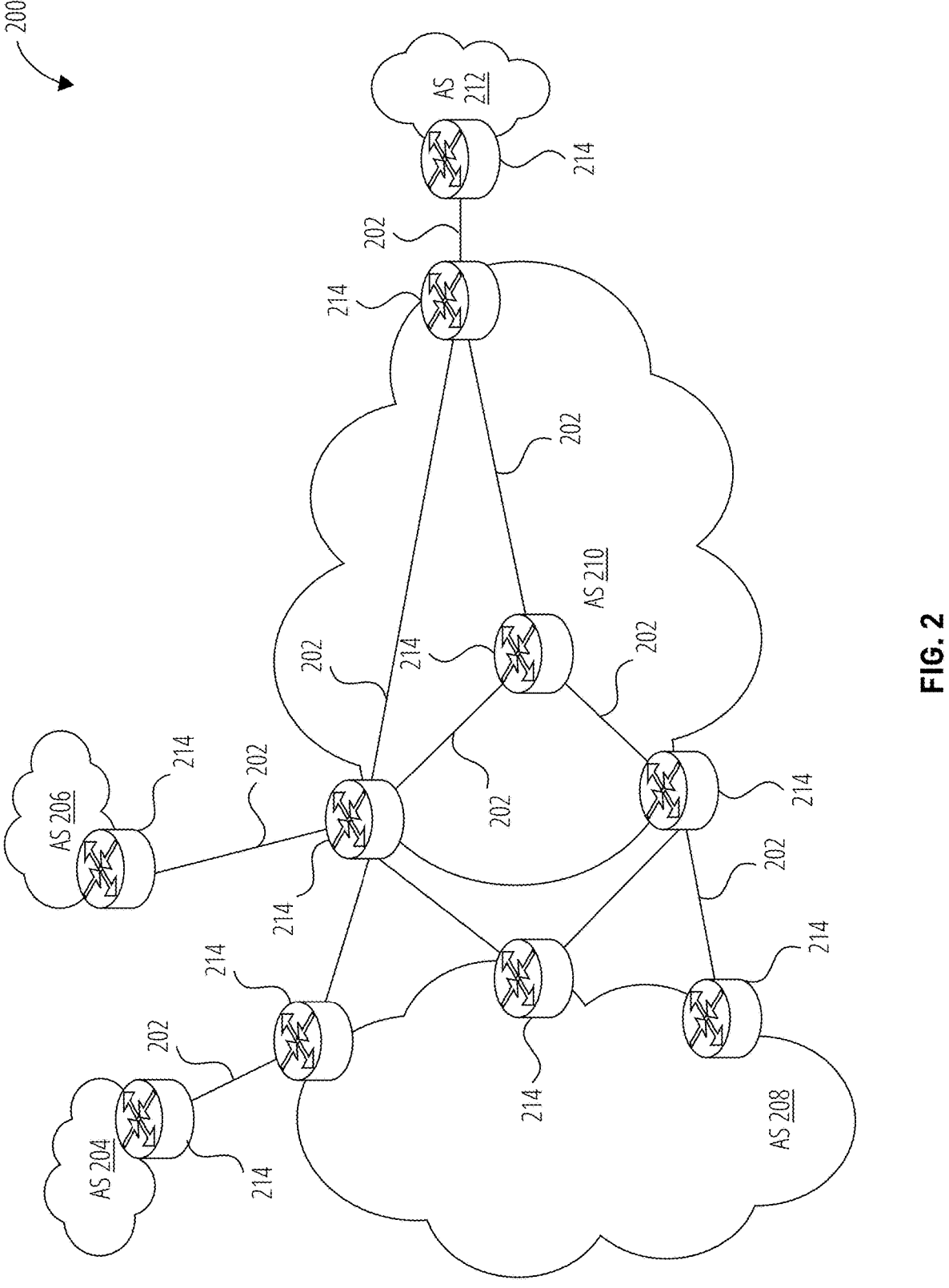
FIG. 2 illustrates an example communication network including one or more autonomous systems (ASes) in accordance with some aspects of the present technology.

FIG. 2 illustrates an example communication network including one or more autonomous systems (ASes) in accordance with some aspects of the present technology. FIG. 2 is a schematic block diagram of an example computer network 200 illustratively comprising network devices 214 interconnected by various methods of communication. For instance, the paths 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with BGP.

As noted above, an AS may be a collection of connected Internet Protocol (IP) routing network devices 214 under the control of one or more network operators that presents a common, clearly defined routing policy to a network (e.g., the Internet). Usually, an AS comprises network control appliances 114 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present technology, the network devices 214 located within an AS may alternatively be referred to as "forwarding network devices" or "intermediate network devices." Moreover, for illustration purposes, the ASes 204, 206, 208, 210, and 212 are shown with a limited number of network devices 214. In an actual implementation, however, an AS normally comprises numerous routers, switches, and other elements.

Each AS 204, 206, 208, 210, and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., paths 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through ASes 204, 206 and 210, in that order.

Although it may be preferable that all network devices 214 in the respective ASes 204, 206, 208, 210, and 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3:
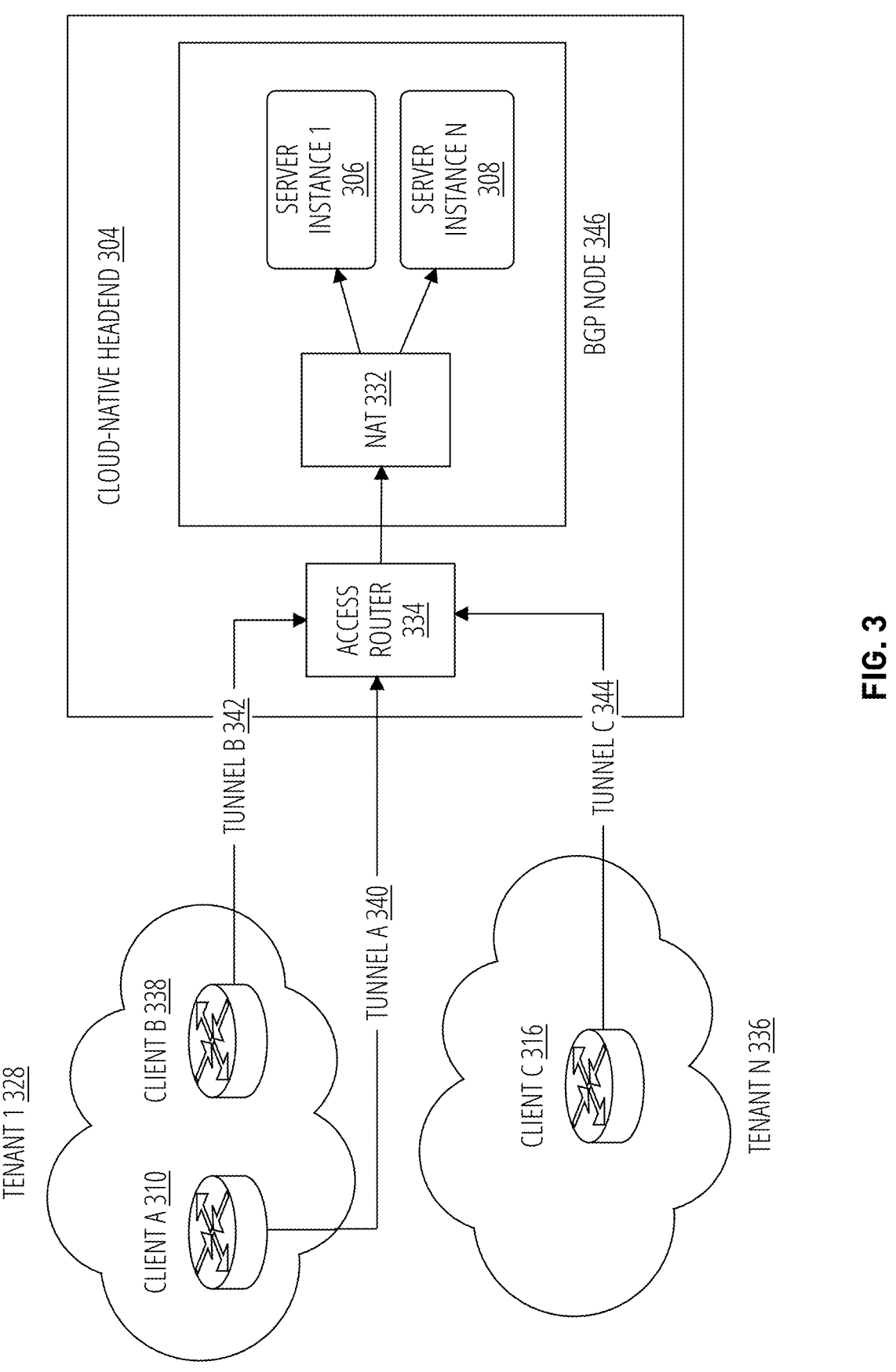
FIG. 3 illustrates an example networked system showing a multi-tenanted cloud-native headend sitting in front of a multi-tenanted BGP network in accordance with some aspects of the present technology.

FIG. 3 illustrates an example networked system showing a multi-tenanted cloud-native headend sitting in front of a multi-tenanted BGP network in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

FIG. 3 illustrates a cloud-native headend 304, which can provide services to multiple tenants, such as tenant 1 328 and/or tenant n 336. In some examples, tenant 1 328 and/or tenant n 336 are SD-WAN networks managed by a central SD-WAN controller, as described in FIG. 1. A cloud-native head end serves as a central point of control and management for various cloud-native applications and services. For example, the cloud-native headend 304 can provide centralized management and orchestration for cloud-native applications and services. This includes tasks like provisioning, scaling, load balancing, and resource allocation. The cloud-native headend 304 is designed to work seamlessly across multiple cloud providers (e.g., AWS, Azure, Google Cloud), enabling organizations to leverage a multi-cloud strategy. The cloud-native headend 304 can abstract away the complexity of dealing with different cloud platforms.

The cloud-native headend 304 can provide a variety of services such as service discovery and load balancing, security and authentication, monitoring and logging, and routing. These systems often include monitoring and logging capabilities, allowing administrators to gain insights into the performance and health of applications and services in real-time. They may integrate with popular monitoring tools and dashboards. In many cases, the cloud-native headend may function as an API gateway, serving as an entry point for external requests, enforcing security policies, and routing traffic to the appropriate backend services.

In particular, in a multi-tenanted BGP network (e.g., the network described in FIG. 2), cloud-native headends (such as cloud-native headend 304) use containerization and microservices to provide scalable, flexible, and isolated routing and traffic management for multiple tenants. They establish BGP sessions to exchange routing information and apply tenant-specific policies, ensuring high availability and efficient resource utilization. This architecture enhances security, compliance, and performance by dynamically scaling services, maintaining tenant isolation, and optimizing network operations.

In some examples, cloud-native headend 304 may be associated with one or more tenants on a network, such as tenant 1 328 and/or tenant n 336. The tenants associated with cloud-native headend 304 may include one or more clients. For example, tenant 1 328 may be associated with client A 310 and client B 338, and tenant n 336 may be associated with client C 316. These clients may be associated with respective BGP devices within the SD-WAN network of the client. As an illustrative example, a tenant may be associated with an enterprise and the clients may be associated with one or more departments of the enterprise, such as human resources, accounting, engineering, marketing, etc.

The tenants associated with cloud-native headend 304 may transmit requests to access services accessible via the cloud-native headend 304 (e.g., cloud-based applications, services, etc.). However, the tenants and/or the clients of the one or more tenants may require isolation from each other. In some examples, security protocols and/or networking protocols may differ from client to client of a single tenant. For example, the accounting department and the engineering department may be associated with different security and/or access policies. Thus, to increase efficiency of the network and to effectively enforce security policies between tenants and/or clients, isolation should be maintained at cloud-based applications and services. The cloud-native headend 304 may be configured to establish multiple instances of a BGP session associated with a particular application requested by the clients and/or tenants.

Within the network, transmissions between clients and/or tenants may be transmitted via one or more tunnels. For example, transmissions associated with client A 310 may be transmitted via tunnel A 340, transmissions associated with client B 338 may be transmitted via tunnel B 342, and transmissions associated with client C 316 may be transmitted via tunnel C 344. The tunnels may transmit communications between respective clients and an access router associated with the cloud-native headend 304 (e.g., access router 334).

SD-WAN networks, such as the networks associated with tenant 1 328 and/or tenant n 336, may be associated with a respective IP address range. However, in some examples, the IP address range of more than one SD-WAN networks may be the same. This issue creates ambiguity and confusion within devices on the network as to where transmissions should be directed. Further, maintaining isolation between tenants is essential to enforcing security protocols and measures implemented on a network. By using tunnels, access router 334, NAT 332, BGP node 346, BGP server instances, any combination thereof, or the like, a networking system (as illustrated in FIG. 3), may maintain isolation using aspects of the present technology.

In some examples, a client may request to access a BGP server associated with the cloud-native headend 304. For example, the client may request to access BGP node 346. The client (e.g., client A 310) may transmit a BGP packet to an associated device within the network of tenant 1 328. The BGP packet may include a source and/or destination IP address, a source and/or destination port, a message, any combination thereof, or the like. The associated device may transmit the BGP packet to an associated access router (e.g., access router 334) of the cloud-native headend (e.g., cloud-native headend 304). Before receipt at access router 334, the BGP packet may be modified to include a 5-tuple (e.g., source IP address, destination IP address, source port number, destination port number, and transport protocol), generating a "tunnel packet." The tunnel packet may be generated at the device associated with client A 310 (e.g., a router). In some examples, the tunnel packet may include an encrypted version of the BGP packet, a port associated with client A 310 and/or tunnel A 340, a port associated with the cloud-native headend 304, the IP address associated with client A 310, and/or the IP address associated with the cloud-native headend 304. Tunnel A 340 may transmit the tunnel packet to access router 334.

In a similar fashion, tunnel B 342 may transmit tunnel packets associated with client B 338 and tunnel C 344 may transmit tunnel packets associated with client C 316. The 5-tuple included within tunnel packets may be used to differentiate between traffic. For example, the port numbers included in the 5-tuple of the tunnel packets may be an indicator of the source of the traffic, in cases where the IP address of the tenant/client may be duplicated by other tenants/clients (e.g., client A 310 has the same IP address as client B 338).

Access router 334 may terminate the IP tunnels (e.g., tunnel A 340, tunnel B 342, and/or tunnel C 344) and may encode the data within the tunnel packet into an encapsulated packet (e.g., Geneve packet, VXLAN, GRE, etc.). Depending on the type of encapsulated packet, the data (e.g., tenant ID, tunnel ID, etc.) may be encoded in one or more manners (e.g., VXLAN, VNI, metadata, etc.). A Geneve packet encapsulates Layer 2 or Layer 3 network packets (e.g., tunnel packet) within a Geneve header, which is then carried inside a User Datagram Protocol (UDP) packet for transport across networks. It provides a flexible and extensible framework for network virtualization, supporting additional metadata through optional Type-Length-Value fields and promoting interoperability among different virtualization solutions. For example, the Geneve packet may include metadata pertaining to a tenant identifier and/or a tunnel identifier. The tenant identifier and/or tunnel identifier may be generated according to the BGP packet and/or the tunnel packet, such as port numbers, IP addresses, etc. In some examples, the Geneve packet may include a virtual network identifier (VNI) encoded with the tenant identifier, while the tunnel identifier (associated with a respective port of access router 334) may be metadata transmitted with the Geneve packet header. The Geneve packet may also include an IP address associated with the access router 334 (i.e., source IP), an IP address associated with a BGP node 346 (i.e., destination IP), a port associated with the access router 334, a port associated with the BGP node 346, and/or the BGP packet.

The Geneve packet may be received at a NAT 332. The stateful NAT (Network Address Translation) keeps track of the state of active connections, ensuring that traffic returning from associated BGP instances is correctly routed back to the originating tenant/client. This allows for dynamic allocation of IP addresses and ports, providing enhanced security and efficient use of IP address space. The NAT 332 may access one or more routing tables that may include references to one or more tenants, clients, tunnels, BGP instances, BGP nodes, ports, IP addresses, any combination thereof, or the like. The NAT 332 may reference the one or more routing tables to ensure that traffic is routed correctly to maintain isolation amongst clients and/or tenants. The NAT 332 may terminate the Geneve tunnel and encode the tenant identifier (received in the metadata provided by the Geneve tunnel) in a destination IP address. In some examples, since the tenant identifier is encoded within the destination IP address, clients associated with the tenant of the tenant identifier may be directed to the same BGP server instance. The NAT 332 may also encode the tunnel identifier into a BGP source IP address. The NAT 332 may store the BGP source IP addresses and port numbers associated with the BGP packet in the one or more routing tables.

Based on the destination IP address, the NAT 332 may direct associated traffic to an appropriate BGP server instance. Additionally, as illustrated in FIG. 3, the cloud-native headend 304 is scalable and can instantiate instances such as server instance 1 306 and server instance n 308 as needed. For example, traffic from client A 310 may be directed to server instance 1 306, while traffic from client C 316 may be directed to server instance n 308. In some examples, based on the structure of the network, one or more clients may be associated with one BGP server instance. For example, client A 310 and client B 338 may both be directed to server instance 1 306. In some other examples, clients may be associated with a respective server instance.

In some examples, the BGP server instances may send return transmissions to respective tenants and/or clients. The NAT 332 may receive one or more transmissions from the BGP server instances and may transform them accordingly. The transmissions may include a tunnel identifier encoded in a destination IP address (similar to the transmission received by the BGP server instance). In some examples, a return tenant ID may be encoded in a source IP of the return transmission. In some examples, a return tunnel ID may be encoded in a destination IP of the return transmission. For example, service 1 616 may direct traffic to an IP address associated with tunnel A 340. Using the one or more routing tables, access router 334 may transform the received return transmission such that it is directed to the correct client.

FIG. 4 illustrates an example flowchart for method 400 for statefully mapping the received network traffic to the appropriate isolated instances of the multi-tenanted BGP network according to some aspects of the present technology. Although the example flowchart depicts a particular sequence of operations, the sequence may be altered without departing from the scope of the present technology. For example, some of the operations depicted may be performed in parallel or in a different sequence that does not materially affect the function of the example flowchart. In other examples, different components of an example device or system that implements the example flowchart may perform functions at substantially the same time or in a specific sequence.

According to some examples, the method includes receiving, by a multi-tenanted cloud-native headend, a request to create a BGP session with a BGP server instance to exchange BGP routes over a multi-tenanted BGP network, the request to create the BGP session is received over a first tunnel associated with a first tenant having a first tenant ID and the first tunnel having a tunnel ID at block 402. For example, the cloud-native headend 304 (as described in FIG. 3) may receive, from access router 334 (as described in FIG. 3), a request to create a BGP session with a BGP server instance to exchange BGP routes over a multi-tenanted BGP network, the request to create the BGP session is received over tunnel A 340 (as described in FIG. 3) associated with tenant 1 328 (as described in FIG. 3) having a first tenant ID and tunnel A 340 having a tunnel ID.

In some examples, a client of the tenant may request to access a BGP server associated with the cloud-native headend. The client may transmit a BGP packet to an associated device (e.g., a router associated with the client and/or tenant). The BGP packet may include a source and/or destination IP address, a source and/or destination port, a message, any combination thereof, or the like. The BGP packet may be directed to an IP address associated with the cloud-native headend and may include a source IP address associated with the client and/or tenant. The associated device may transmit the BGP packet to an access router associated with the cloud-native headend. Before receipt at the access router, the BGP packet may be modified to include a 5-tuple (e.g., source IP address, destination IP address, source port number, destination port number, and transport protocol), generating a "tunnel packet." A tunnel associated with the client may transmit the tunnel packet to the access router.

According to some examples, the method includes translating a transmission header into a Geneve packet, wherein the tenant ID is encoded into a VNI (virtual network identifier) in the Geneve packet, and wherein the tunnel ID is stored as metadata associated with the Geneve packet at block 404. For example, access router 334 (as described in FIG. 3) may translate the transmission header into the Geneve packet, wherein the tenant ID is encoded into a VNI in the Geneve packet, and wherein the tunnel ID is stored as metadata associated with the Geneve packet.

The access router may terminate the tunnels and may encode the data within the tunnel packet into a Geneve packet. The Geneve packet may include metadata pertaining to a tenant identifier and/or a tunnel identifier. The tenant identifier and/or tunnel identifier may be generated according to the BGP packet and/or the tunnel packet, such as port numbers, IP addresses, etc. In some examples, the Geneve packet may include a virtual network identifier (VNI) encoded with the tenant identifier, while the tunnel identifier (associated with a respective port of the access router) may be metadata transmitted with the Geneve packet header. The Geneve packet may also include an IP address associated with the access router (i.e., source IP), an IP address associated with a BGP server node (i.e., destination IP), a port associated with the access router, a port associated with the BGP server node, and/or the BGP packet.

According to some examples, the method includes translating, using a NAT service, header information from the Geneve packet and metadata, wherein the NAT service translates the tenant ID into a destination BGP IP address used for BGP communications with the BPG server from the first tenant, and translates the tunnel ID into a BGP source IP address used for BGP communications with the BGP server from the first tunnel at block 406. For example, NAT 332 (as described in FIG. 3) may translate header information from the Geneve packet and metadata, wherein NAT 332 may translate the tenant ID into the destination BGP IP address used for BGP communications with the BGP server from tenant 1 328 (as described in FIG. 3), and translates the tunnel ID into the BGP source IP address used for BGP communications with the BGP server from tunnel A 340 (as described in FIG. 3).

The Geneve packet may be received at the NAT service. The NAT service may access one or more routing tables that may include references to one or more tenants, clients, tunnels, BGP instances, BGP nodes, ports, IP addresses, any combination thereof, or the like. The NAT service may terminate the Geneve tunnel and encode the tenant identifier (received in the metadata provided by the Geneve tunnel) in a destination IP address. In some examples, since the tenant identifier is encoded within the destination IP address, clients associated with the tenant of the tenant identifier may be directed to the same BGP server instance. The NAT service may also encode the tunnel identifier into a BGP source IP address. The NAT service may store the BGP source IP addresses and port numbers associated with the BGP packet in the one or more routing tables. In this scheme, the tenant ID is used as the destination IP because the BGP server instance is specific to the tenant. Thus, all tenant traffic is directed to the same BGP server instance regardless of which tunnel the traffic arrives on. The tunnel ID is used as the source IP address so that return traffic can be directed back to the same tunnel on which the traffic arrived.

According to some examples, the method includes establishing the BGP session with the BGP server instance that is specific to the tenant using the source BGP IP address and destination BGP IP address from the NAT service at block 408. For example, cloud-native headend 304 (as described in FIG. 3) may establish the BGP session with the BGP server instance that is specific to tenant 1 328 (as described in FIG. 3) using the source BGP IP address and destination BGP IP address from NAT 332 (as described in FIG. 3).

Based on the BGP source IP address, the NAT service may direct associated traffic to an appropriate BGP server instance. The cloud-native headend may be scalable and can instantiate instances as needed for one or more tenants. In some examples, based on the structure of the network, one or more clients may be associated with one BGP server instance. For example, client A 310 (as described in FIG. 3) and client B 338 (as described in FIG. 3) may both be directed to server instance 1 306 (as described in FIG. 3). In some other examples, clients may be associated with a respective server instance.

Figure 5:
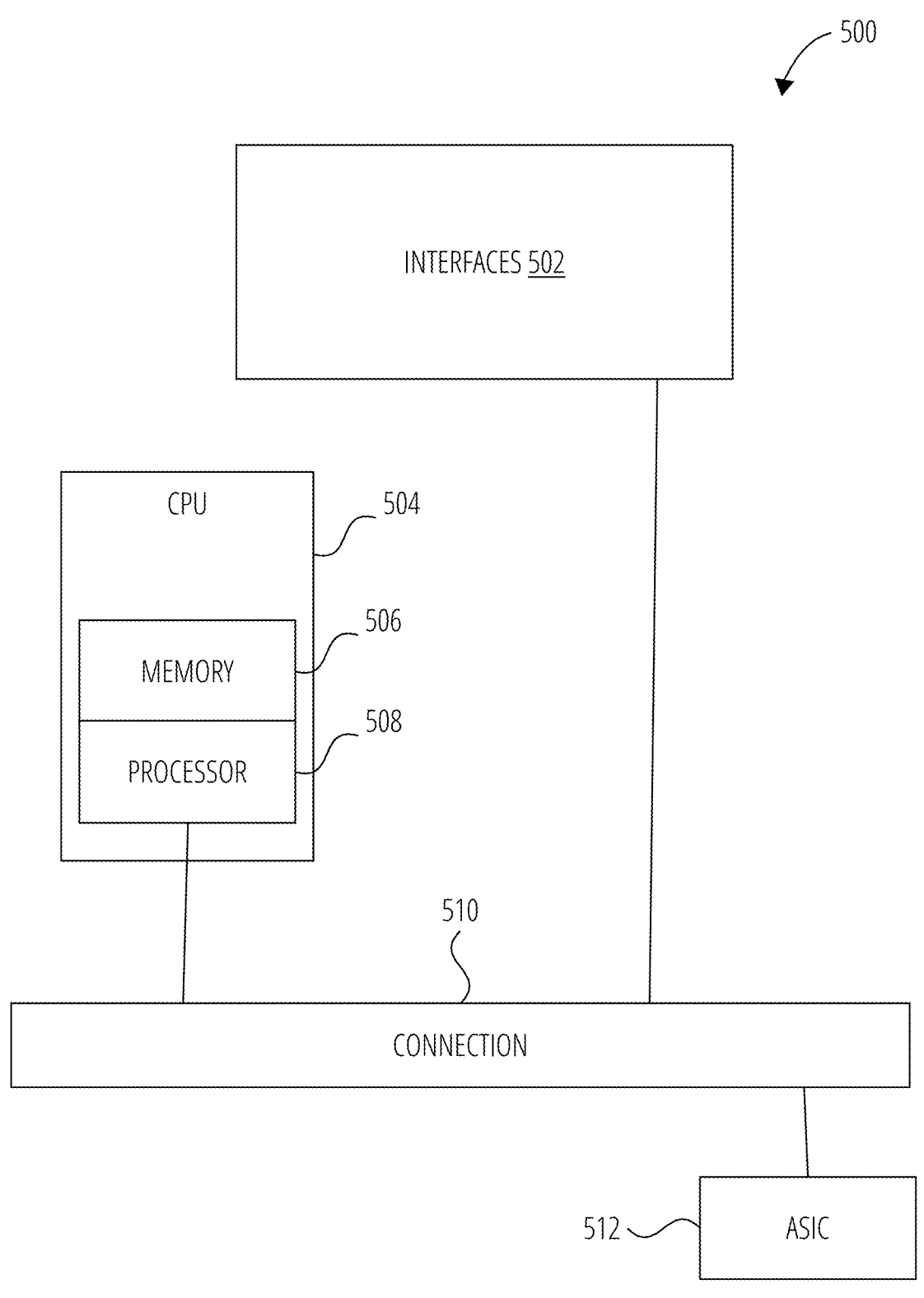
FIG. 5 illustrates an example network device in accordance with some aspects of the present technology.

FIG. 5 illustrates an example network device in accordance with some aspects of the disclosure. FIG. 5 illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the connection 510, to exchange data and signals and coordinate various types of operations by the network device 500, such as routing, switching, and/or data storage operations, for example.

Figure 6:
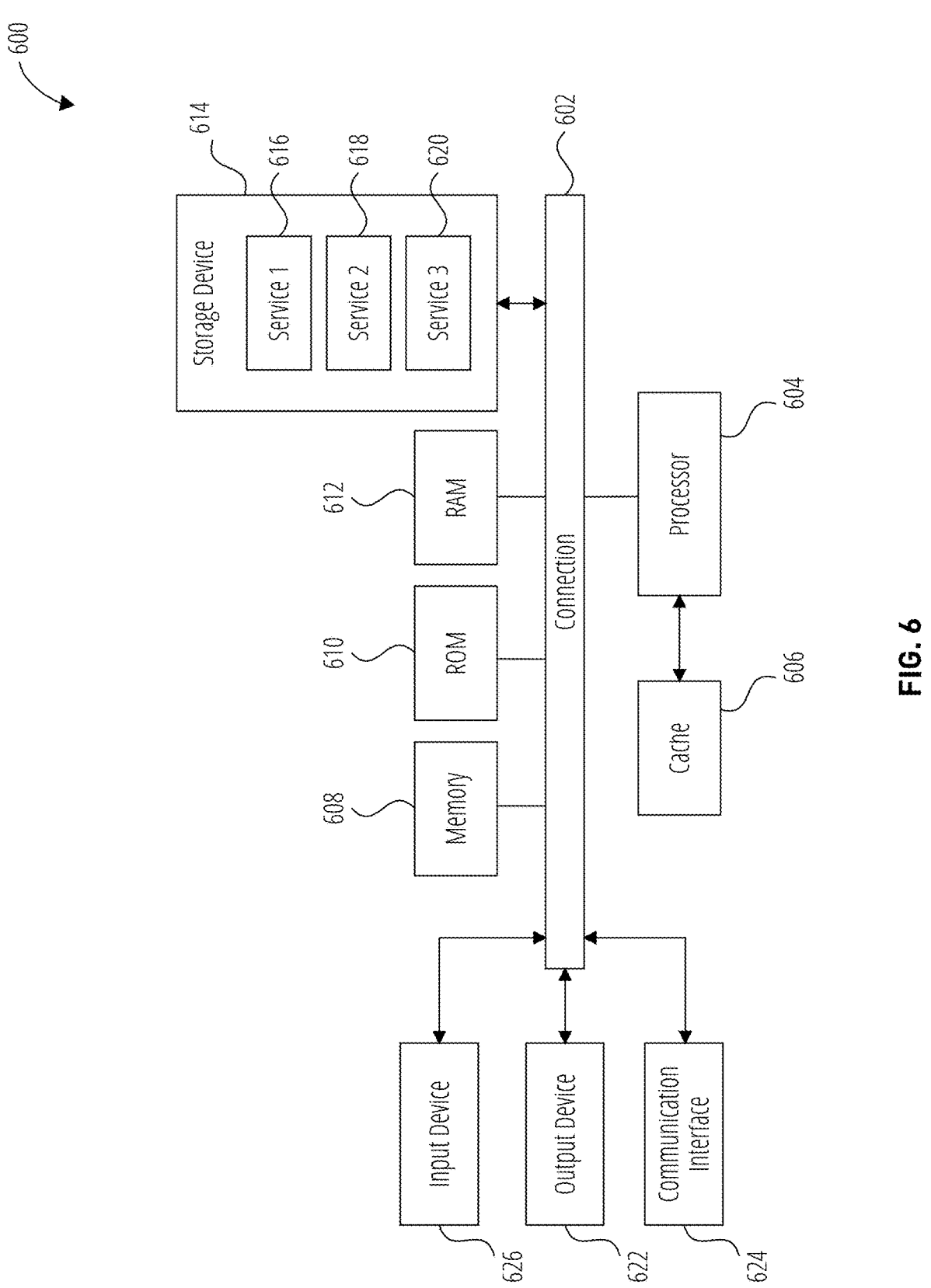
FIG. 6 shows an example of a computing system for implementing some aspects of the present technology.

FIG. 6 shows an example of computing system 600, which can be for example any computing device making up cloud-native headend 304 or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising: receiving, by a multi-tenanted cloud-native headend, a request to create a BGP session with a Border Gateway Protocol (BGP) server instance to exchange BGP routes over a multi-tenanted BGP network, the request to create the BGP session is received over a first tunnel associated with a first tenant having a first tenant ID and the first tunnel having a first tunnel ID; translating a transmission header into a Geneve packet, wherein the first tenant ID is encoded into a first VNI in the Geneve packet, and wherein the first tunnel ID is stored as metadata associated with the Geneve packet; translating, using a NAT service, header information from the Geneve packet and metadata, wherein the NAT service translates the first tenant ID into a destination BGP IP address used for BGP communications with a BGP server from the first tenant, and translates the first tunnel ID into a source BGP IP address used for BGP communications with the BGP server from the first tunnel; and establishing the BGP session with the BGP server instance that is specific to the first tenant using the source BGP IP address and the destination BGP IP address from the NAT service.

2. The method of claim 1, further comprising: receiving, by a multi-tenanted cloud-native headend, a second request to create a second BGP session with the BGP server instance, the second request is received over a second tunnel associated with a second tenant having a second tenant ID and the second tunnel having a second tunnel ID, wherein the second tenant ID is identical to the first tenant ID associated with the first tenant; translating a second transmission header into a second Geneve packet, wherein the second tenant ID is encoded into a second VNI in the second Geneve packet, and wherein the second tunnel ID is stored as metadata associated with the second Geneve packet; translating, using the NAT service, header information from the second Geneve packet and metadata, wherein the NAT service translates the second tenant ID into a second destination BGP IP address used for BGP communications with the BGP server from the second tenant, and translates the second tunnel ID into a second source BGP IP address used for BGP communications with the BGP server from the second tunnel; and establishing the second BGP session with the BGP server instance using the second source BGP IP address and the second destination BGP IP address from the NAT service.

3. The method of claim 1, wherein a client IP address and a port in the transmission header identifies the first tenant ID.

4. The method of claim 1, wherein a client IP address and a port in the transmission header identifies the first tunnel ID.

5. The method of claim 1, wherein the first tunnel ID is stored in association with the BGP server instance in a routing table accessible by the multi-tenanted cloud-native headend.

6. The method of claim 1, further comprising: receiving a transmission from the BGP session associated with the BGP server instance, wherein a return tenant ID and a return tunnel ID are inferred from the BGP session and encoded in a return destination BGP IP address and a return source BGP IP address, wherein the transmission from the BGP session is encapsulated within a third Geneve packet by the NAT service; and transforming the third Geneve packet to include a return client IP and a return port based on the return tunnel ID and the return tenant ID.

7. The method of claim 1, wherein the multi-tenanted BGP network utilizes route isolation to isolate the network of the first tenant from networks of other tenants making use of the multi-tenanted BGP network.

8. A computing apparatus comprising: a processor; and a memory storing instructions that, when executed by the processor, configure the apparatus to: receive, by a multi-tenanted cloud-native headend, a request to create a BGP session with a Border Gateway Protocol (BGP) server instance to exchange BGP routes over a multi-tenanted BGP network, the request to create the BGP session is received over a first tunnel associated with a first tenant having a first tenant ID and the first tunnel having a first tunnel ID; translate a transmission header into a Geneve packet, wherein the first tenant ID is encoded into a first VNI in the Geneve packet, and wherein the first tunnel ID is stored as metadata associated with the Geneve packet; translate, using a NAT service, header information from the Geneve packet and metadata, wherein the NAT service translates the first tenant ID into a destination BGP IP address used for BGP communications with a BGP server from the first tenant, and translates the first tunnel ID into a source BGP IP address used for BGP communications with the BGP server from the first tunnel; and establish the BGP session with the BGP server instance that is specific to the first tenant using the source BGP IP address and the destination BGP IP address from the NAT service.

9. The computing apparatus of claim 8, wherein the instructions further configure the apparatus to: receive, by a multi-tenanted cloud-native headend, a second request to create a second BGP session with the BGP server instance, the second request is received over a second tunnel associated with a second tenant having a second tenant ID and the second tunnel having a second tunnel ID, wherein the second tenant ID is identical to the first tenant ID associated with the first tenant; translate a second transmission header into a second Geneve packet, wherein the second tenant ID is encoded into a second VNI in the second Geneve packet, and wherein the second tunnel ID is stored as metadata associated with the second Geneve packet; translate, using the NAT service, header information from the second Geneve packet and metadata, wherein the NAT service translates the second tenant ID into a second destination BGP IP address used for BGP communications with the BGP server from the second tenant, and translates the second tunnel ID into a second source BGP IP address used for BGP communications with the BGP server from the second tunnel; and establish the second BGP session with the BGP server instance using the second source BGP IP address and the second destination BGP IP address from the NAT service.

10. The computing apparatus of claim 8, wherein a client IP address and a port in the transmission header identifies the first tenant ID.

11. The computing apparatus of claim 8, wherein a client IP address and a port in the transmission header identifies the first tunnel ID.

12. The computing apparatus of claim 8, wherein the first tunnel ID is stored in association with the BGP server instance in a routing table accessible by the multi-tenanted cloud-native headend.

13. The computing apparatus of claim 8, wherein the instructions further configure the apparatus to: receive a transmission from the BGP session associated with the BGP server instance, wherein a return tenant ID and a return tunnel ID are inferred from the BGP session and encoded in a return destination BGP IP address and a return source BGP IP address, wherein the transmission from the BGP session is encapsulated within a third Geneve packet by the NAT service; and transform the third Geneve packet to include a return client IP and a return port based on the return tunnel ID and the return tenant ID.

14. The computing apparatus of claim 8, wherein the multi-tenanted BGP network utilizes route isolation to isolate the network of the first tenant from networks of other tenants make use of the multi-tenanted BGP network.

15. A non-transitory computer-readable storage medium, the computer-readable storage medium including instructions that when executed by a computer, cause the computer to: receive, by a multi-tenanted cloud-native headend, a request to create a BGP session with a BGP server instance to exchange BGP routes over a multi-tenanted BGP network, the request to create the BGP session is received over a first tunnel associated with a first tenant having a first tenant ID and the first tunnel having a first tunnel ID; translate a transmission header into a Geneve packet, wherein the first tenant ID is encoded into a VNI in the Geneve packet, and wherein the first tunnel ID is stored as metadata associated with the Geneve packet; translate, using a NAT service, header information from the Geneve packet and metadata, wherein the NAT service translates the first tenant ID into a destination BGP IP address used for BGP communications with a BGP server from the first tenant, and translates the first tunnel ID into a source BGP IP address used for BGP communications with the BGP server from the first tunnel; and establish the BGP session with the BGP server instance that is specific to the first tenant using the source BGP IP address and the destination BGP IP address from the NAT service.

16. The non-transitory computer-readable storage medium of claim 15, wherein the instructions further configure the computer to: receive, by a multi-tenanted cloud-native headend, a second request to create a second BGP session with the BGP server instance, the second request is received over a second tunnel associated with a second tenant having a second tenant ID and the second tunnel having a second tunnel ID, wherein the second tenant ID is identical to the first tenant ID associated with the first tenant; translate a second transmission header into a second Geneve packet, wherein the second tenant ID is encoded into a second VNI in the second Geneve packet, and wherein the second tunnel ID is stored as metadata associated with the second Geneve packet; translate, using the NAT service, header information from the second Geneve packet and metadata, wherein the NAT service translates the second tenant ID into a second destination BGP IP address used for BGP communications with the BGP server from the second tenant, and translates the second tunnel ID into a second source BGP IP address used for BGP communications with the BGP server from the second tunnel; and establish the second BGP session with the BGP server instance using the second source BGP IP address and the second destination BGP IP address from the NAT service.

17. The non-transitory computer-readable storage medium of claim 15, wherein a client IP address and a port in the transmission header identifies the first tenant ID.

18. The non-transitory computer-readable storage medium of claim 15, wherein a client IP address and a port in the transmission header identifies the first tunnel ID.

19. The non-transitory computer-readable storage medium of claim 15, wherein the first tunnel ID is stored in association with the BGP server instance in a routing table accessible by the multi-tenanted cloud-native headend.

20. The non-transitory computer-readable storage medium of claim 15, wherein the instructions further configure the computer to: receive a transmission from the BGP session associated with the BGP server instance, wherein a return tenant ID and a return tunnel ID are inferred from the BGP session and encoded in a return destination BGP IP address and a return source BGP IP address, wherein the transmission from the BGP session is encapsulated within a third Geneve packet by the NAT service; and transform the third Geneve packet to include a return client IP and a return port based on the return tunnel ID and the return tenant ID.

* * * * *